United States Patent [19]
MacDonald et al.

[11] Patent Number: 5,867,572
[45] Date of Patent: Feb. 2, 1999

[54] CUSTOMER QUEUING ARRANGEMENT

[75] Inventors: Paul MacDonald; Richard John Akester, both of Suffolk, United Kingdom

[73] Assignee: British Telecommunications public limited company, London, England

[21] Appl. No.: 603,104

[22] Filed: Feb. 20, 1996

[30] Foreign Application Priority Data

Oct. 17, 1995 [EP] European Pat. Off. ............... 95307386

[51] Int. Cl.⁶ ..................................................... H04M 3/00
[52] U.S. Cl. ............................................ 379/266; 379/309
[58] Field of Search ....................................... 379/266, 309

[56] References Cited

U.S. PATENT DOCUMENTS

| | | | |
|---|---|---|---|
| 4,788,715 | 11/1988 | Lee | 379/84 |
| 5,020,095 | 5/1991 | Morganstein et al. | 379/67 |
| 5,025,468 | 6/1991 | Sikand et al. | 379/67 |
| 5,432,846 | 7/1995 | Norio | 379/266 |
| 5,506,898 | 4/1996 | Costautini et al. | 379/266 |
| 5,511,112 | 4/1996 | Szlam | 379/88 |
| 5,592,542 | 1/1997 | Honda et al. | 379/265 |
| 5,600,710 | 2/1997 | Weisser, Jr. et al. | 379/67 |

OTHER PUBLICATIONS

Perry et al, "Performance Modelling of Automatic Call Distributors: Assignable Grade of Service Staffing", XIV International Switching Symposium, 1992, vol. 1, 25–30 Oct. 1992, Yokohama, Japan, pp. 294–298, XP 000337733.

*Primary Examiner*—Fan S. Tsang
*Attorney, Agent, or Firm*—Nixon & Vanderhye P.C.

[57] ABSTRACT

A customer queuing system receives telephone calls on one port of a switching system for handling by servers attached to output ports of the switching system. The queuing system estimates the waiting time which may be expected by each customer arriving at an input port and utilizes a voice announcement system to inform callers during the queue of the estimated waiting period prior to connection to one of the servers.

21 Claims, 7 Drawing Sheets

Data Tables

| No | Caller | Time | Notice | Est | Type |
|---|---|---|---|---|---|
| 1 | | | | | |
| 2 | | | | | |
| 3 | | | | | |
| | | ⋮ | | | |
| N-1 | | | | | |
| N | | | | | |

Data Table 1

| Server | Last Start | Type | Active | Est Clear |
|---|---|---|---|---|
| 1 | | | | |
| 2 | | | | |
| | ⋮ | | | |
| n-1 | | | | |
| n | | | | |

Data Table 2

| Est Wait | Actual Wait |
|---|---|
| | |
| ⋮ | ⋮ |
| | |
| | Performance |

Data Table 3

| Type 1 | Type 2 | Type 3 | Type 4 | ---- | Type .. |
|---|---|---|---|---|---|
| | | | | ---- | |
| | | | | ---- | |
| ⋮ | ⋮ | ⋮ | ⋮ | ⋮ | ⋮ |
| | | | | ---- | |
| | | | | ---- | |
| | | | | ---- | |

Data Table 4

Figure 2

CUSTOMER QUEUING ARRANGEMENT

BACKGROUND OF THE INVENTION

1. Field of the Invention

The present invention relates to a customer queuing arrangement, and more particularly to such an arrangement for use in providing telecommunications services.

2. Related Art

Many organizations such as mail order companies, banks, repair companies, information providers and emergency service providers have many more telephone access lines than they have operators available to handle calls. This is a more efficient way of handling telephone access requirements since operators are not idle while awaiting the next incoming call as would be the case if the number of operators and number of lines were equal. Further, at peak times, customers calling the service do not have to re-dial when lines are particularly busy.

It has become customary for an automated answering system to pick up calls after a short period of ringing in order to re-assure the customer that they are connected to an appropriate service center. Usually a message is transmitted such as "Please hold the line. You are held in a queue. One of our operators will answer your call as soon as possible." Music or other entertainment may be provided subsequent to the message or ring tone re-instated. After a period, often around one minute, the message is repeated or another message is transmitted.

Some companies, notably in the United States of America, have introduced a "telephone radio show" in which customers joining a tele-sales queue are entertained by a disc jockey or comedian who periodically advises on the length of the queue and indicates the overall waiting time based on the duration of the wait experienced by the most recently answered caller.

Such systems are helpful in avoiding lost calls to the destination but can lead to customer frustration if the wait is lengthy and the same message is repeated. This may result in lost business if the customer hangs up before being passed to an operator and subsequently calls again thus rejoining the queue.

SUMMARY OF THE INVENTION

The present invention seeks to overcome some of the above problems by providing a call queuing system in which the information provided to a given customer is more specifically tailored to each customer's position in the queue.

According to one aspect of the present invention there is provided, in a customer queuing arrangement, a method of estimating an approximate time for which a customer in a queue may be required to wait for a server comprising the steps of determining the position of each customer in the queue, determining for each of a plurality of active servers an average time to handle a customer, determining, from the start time at which each active server last connected with a current customer, the anticipated time at which such server will become available, obtaining a series of times of anticipated availability of active servers, and nominally allocating each customer in the queue to one of the series of times whereby the approximate waiting time for each customer may be determined.

A preferred method of the invention comprises estimating an approximate time for which a designated customer in a queue of customers may be required to wait for a serve, comprising the steps of: determining the number of customers (N) in the queue to be served before the designated customer, calculating the average handling time for each of a plurality of servers to handle a customer connection to provide a mean service time (S), and multiplying the number of customers N by the mean service time S and dividing by the number of active servers (n) to obtain a wait time (W).

Preferably, the calculated wait time W also includes an estimate of the period at which the next server will become available. A further improvement of the calculated wait time may be obtained by comparing previously calculated wait times with actual wait times to derive a weighting factor adjustment for use in subsequent calculations of wait times.

Additionally, where customers may fall into differing categories, a respective mean service time may be determined for each of such categories and used in the calculation of wait time.

According to a second aspect of the invention, there is provided a call queuing system comprising switch means having a plurality of input ports for connection to incoming telephone lines, a plurality of primary output ports for connection to telephone handling servers, control means responsive to calls on the input ports to selectively effect connections through the switch means to one of the output ports, the control means also being arranged to determine which, if any, of the output ports is not currently connected to an input port and to effect connections sequentially to the output ports, the switch means further having at least one secondary output port to which calls arriving at the input ports are switched if none of the primary output ports are available, said secondary output port(s) being connected to an announcement system arranged to transmit a message to calling customers (unanswered customers), characterized in that the control means allocates each unanswered customer to the next position in a queue, calculates an approximate time for which the customer may be expected to wait prior to connection to a telephone handling server, and causes voice announcement means to transmit the calculated time to the customer.

Preferably, service data defines the average service time for each of a multiplicity of previously connected calls and server data defines the number of servers currently available such that the calculation of the approximate wait time takes into account the position of the connected customer in the queue, the number of servers available and the average service time.

Service data may be stored with respect to each of a plurality of different servers such that the calculated times may reflect variations in the speed of call handling by each operator.

The system may also be arranged to store data defining the time of arrival of each call, the calculated wait time at the time of arrival and the actual time of connection of the call, whereby a weighting factor based on the difference between the calculated and actual wait times may be applied to subsequently connected calls.

Where groups of input ports are allocated to different telephone numbers, each of which may indicate a particular customer service requirement, the calculation may include differing service times for each category of customer and/or for each telephone handling server.

A feature of the invention utilizes historic records of caller activity to estimate potential waiting times, taking into account expected stimuli or other predetermined factors.

Expected stimuli may include broadcast or published advertising, holiday or festival dates and the like.

Predetermined factors may include operator shift changes or breaks, an increase or decrease in the number of operators available and time-dependent features such as optional extra discounts or other special offerings, and closure or opening of other server centers,

BRIEF DESCRIPTION OF THE DRAWINGS

A call queuing arrangement in accordance with the invention using the method of the invention will now be described, by way of example only, with reference to the accompanying drawings in which:

FIG. 2 is a schematic diagram of the data tables used by the arrangement in FIG. 1;

DETAILED DESCRIPTION OF EXEMPLARY EMBODIMENTS

Figure 1:
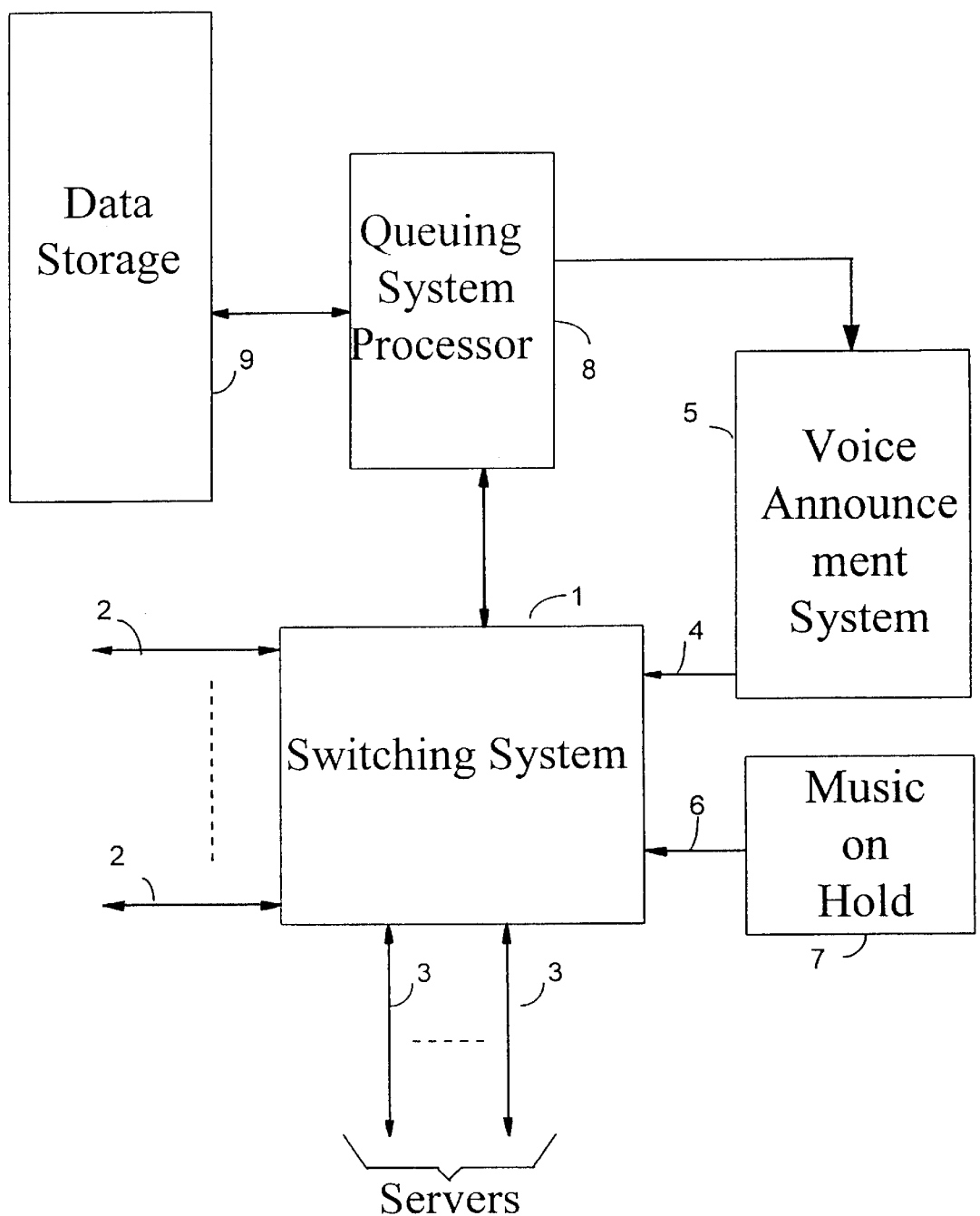
FIG. 1 is a schematic diagram of the call queuing arrangement.

Referring first to FIG. 1, the arrangement essentially comprises a switch 1 having a multiplicity of input ports 2 for connection to incoming telephony traffic, for example for connection to the Public Switched Telephone Network (PSTN). A group of output ports 3 are arranged for connection to a number of telephony servers for example telephone operators. A further port 4 is connected to a voice announcement system 5 and one or more ports 6 are connected to an entertainment facility, for example music on hold 7.

The connection through the switching system 1 is under the control of a store programmed controlled processor 8 which has access to a data store 9 the contents of which will be described hereinafter.

The switching system 1 is arranged to selectively connect individual ports 2 to output ports 3, 4 and 6 under the control of the processor 8. Whenever a call is incoming to the system on the input ports 2, provided there is a server 3 free the system processor 8 will cause the connection of the respective port 2 to the respective free port 3. First referring also to FIGS. 2 and 3, when an incoming call is received on any one of the incoming ports 2, the system processor at step 100 determines whether pointers (not shown) indicating the head of the queue and end of queue respectively in a queue table (table 1) of the data storage system 9, are equal. If it is determined that the head and end of queue are equal the indication is that the queue for handling is currently empty. Thus the queuing system processor 8 interrogates the output ports 3 at step 110 to determine whether any of the servers which are currently active (as indicated in data table 2 of the data storage system 9) are free, and if so, obtains the server identity 115 of such a free server. The switching system is now arranged to connect the incoming call on the input port 2 to an appropriate output port 3 at step 120. The call through the system is now under the control of the operator on the output port 3 and/or the caller on the input port 2 in the normal manner for handling of telephone calls through a telephony switch.

Having connected the caller to a server, the system now identifies the category of incoming call (type) on the basis of the port 2 to which the call was first connected. Considering this identification further, it may be assumed that each of the ports 2 is allocated to one of a plurality of PSTN telephone numbers. Several ports may be associated with the same telephone number. However, the telephone number may indicate whether the call is to an order line for example or to a customer inquiry line. Alternatively, where a bureau is handling calls for several principles the telephone number may indicate the principle type of call. In a further development, the queuing system processor may use incoming line identification, as provided by some system operators, to facilitate the categorization of calls.

Figure 3A:
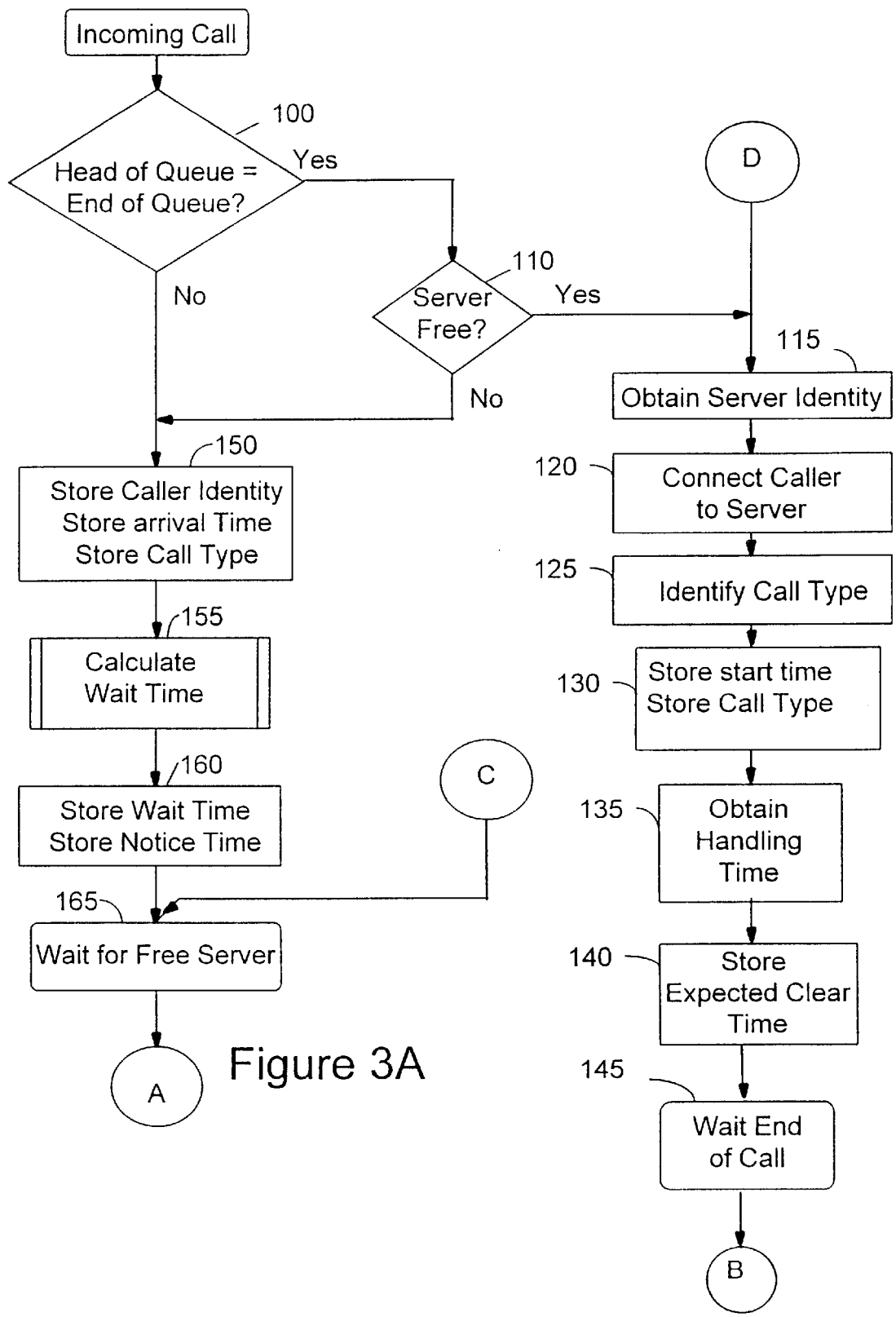
FIGS. 3A and 3B form a flow chart showing the handling of an incoming call by the processors of FIG. 1.
Figure 3B:
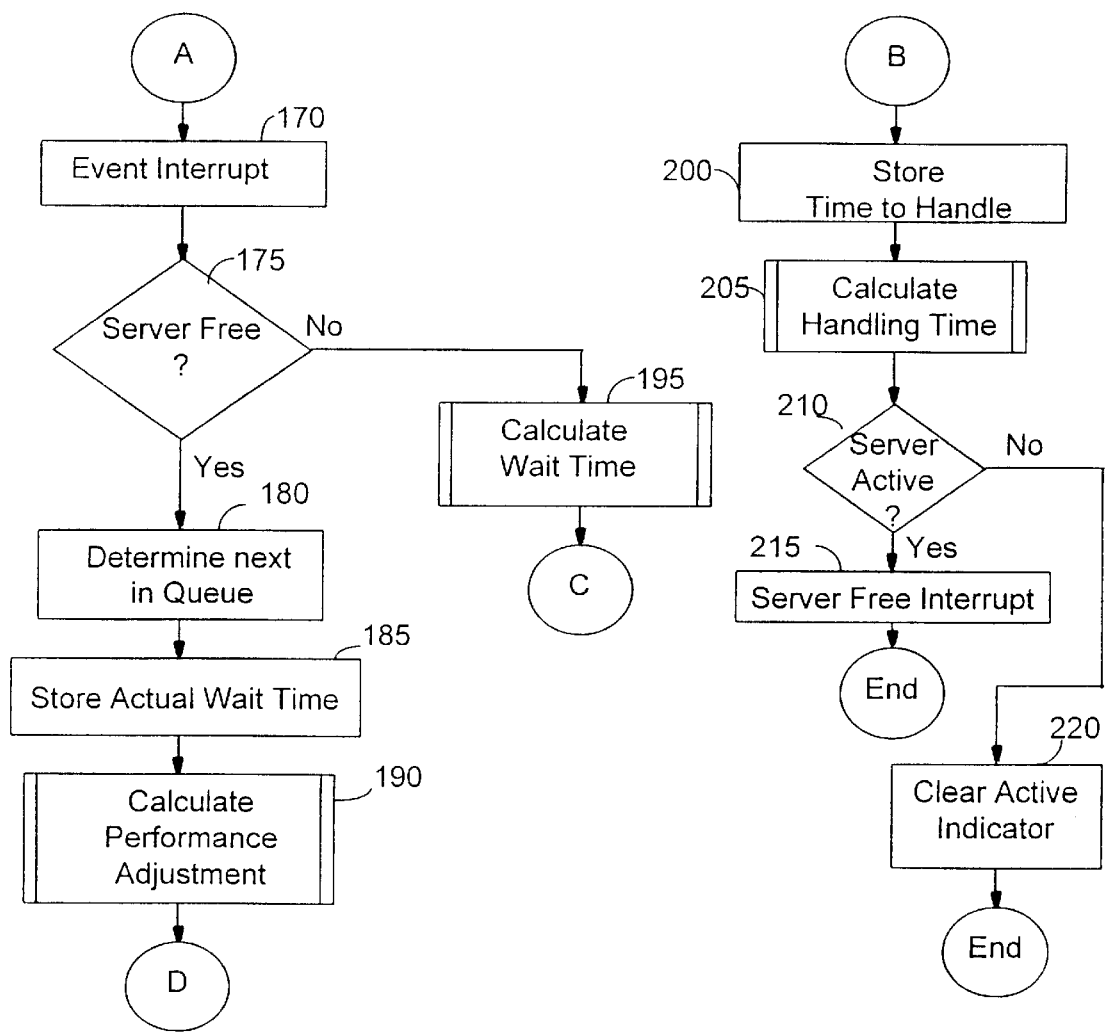

Having determined the call type at step 125 the server stores certain information as shown in table 2. Thus, referring to table 2 each server attached to the port 3 is allocated an entry in the table. Thus the destination port number for each server is represented in the left hand column and the "real time" at which a call directed to the server is stored in the column labelled "LAST START" at step 130. The type of call, as identified at step 125, is also stored. Referring to FIG. 3, at step 135 the typical handling time of a call of a designated type is obtained from data table 4 and by use of the actual start time and the handling time an expected clear time can be entered into column 5 at step 140. With respect to any particular call, step 145 "wait for end of call" now applies.

Returning now to the first step of handling an incoming call at step 100, the head of queue, is not equal to the end of queue this indicates that one or more callers is awaiting handling. The processor 8 then performs a number of storage instructions with respect of to the next position in queue.

Thus, using the address in table 1 specified by the end of queue pointer, prior to updating the pointer (step not shown), the system stores the location of the caller at one of the locations 1–n in terms of the input port 2 on which the call has arrived. In other columns the "real time" at which the call arrived together with the call type as hereinbefore described with reference to step 125 are stored. A calculate wait time macro function 155 is now run in the processor 8 as hereinafter described, and the estimated wait time and the time at which the estimated wait was sent to the caller on input 2 is stored at step 160 respectively in the notice and estimate columns of the data table 1. As indicated at step 165 with respect to a particular call the processor now waits for a free server. Moving on to FIG. 3B, if, during the wait for a free server, the processor 8 receives an interrupt, this may be indicative of one of a number of events. One such event, as determined at step 175, is that a server on one of the ports 3 becomes free. If this is the case, at step 180 the processor 8 determines the head of queue from the head of queue pointer and at step 185 updates a further data table, table 3. The method of updating the data table is to remove from table 3 the oldest indication of estimated wait and actual wait and replace it with the estimated wait from table 1 with respect to the caller now to be connected, and the actual wait endured by that caller on the basis of the time of arrival of the call and the connection time. This data enables a performance adjustment to be carried out by a macro function (hereinafter described) step 190. The identified caller following updating the head of queue pointer (step not shown) is now connected at step 115 as hereinbefore described.

If at step 175 the system determines that there is no server free, the interrupt may have arisen because a periodic timer, or real time indicator, shows that the period since notice was last given to the caller as indicated in table 1 has exceeded a predetermined period. If this should occur the calculate wait time macro function runs at step 195.

Other events which may cause an event interrupt may, for example, include additional servers coming on line or a change of server pattern or shift.

Once a call is in progress, i.e. there is connection between an input port 2 and a server output 3, the processor 8 awaits an indication that the call has terminates. Once the call is terminated the processor 8 proceeds at step 200 to determine from the start time as indicated in table 2 and the current time the actual time taken to handle the specific call.

This information is stored with a further data table, table 4, in respect to the specific type of call, as indicated in table 2, erasing the oldest data with respect to that particular call type. For the avoidance of doubt, it is noted that table 4 may be repeated for each server if variations in individual servers handling capacity are required to be taken into account. It is also noted that where only one type of call, or a single input type, is identifiable then only a "single column" data table is required for each server or system.

Having stored the handling time, the processor 8 may calculate the handling time at step 205. If the server remains active as indicated at step 210 then at step 215 a "server free" interrupt is provided to cause the next queuing call to move into step 170. Assuming that the server has decided not to handle further calls as determined at step 210, table 2 is updated at step 215 by clearing the active indicator. Until such time as the server again becomes active, further action to connect input port 2 to output port 3 for the respective server will not occur.

Figure 4:
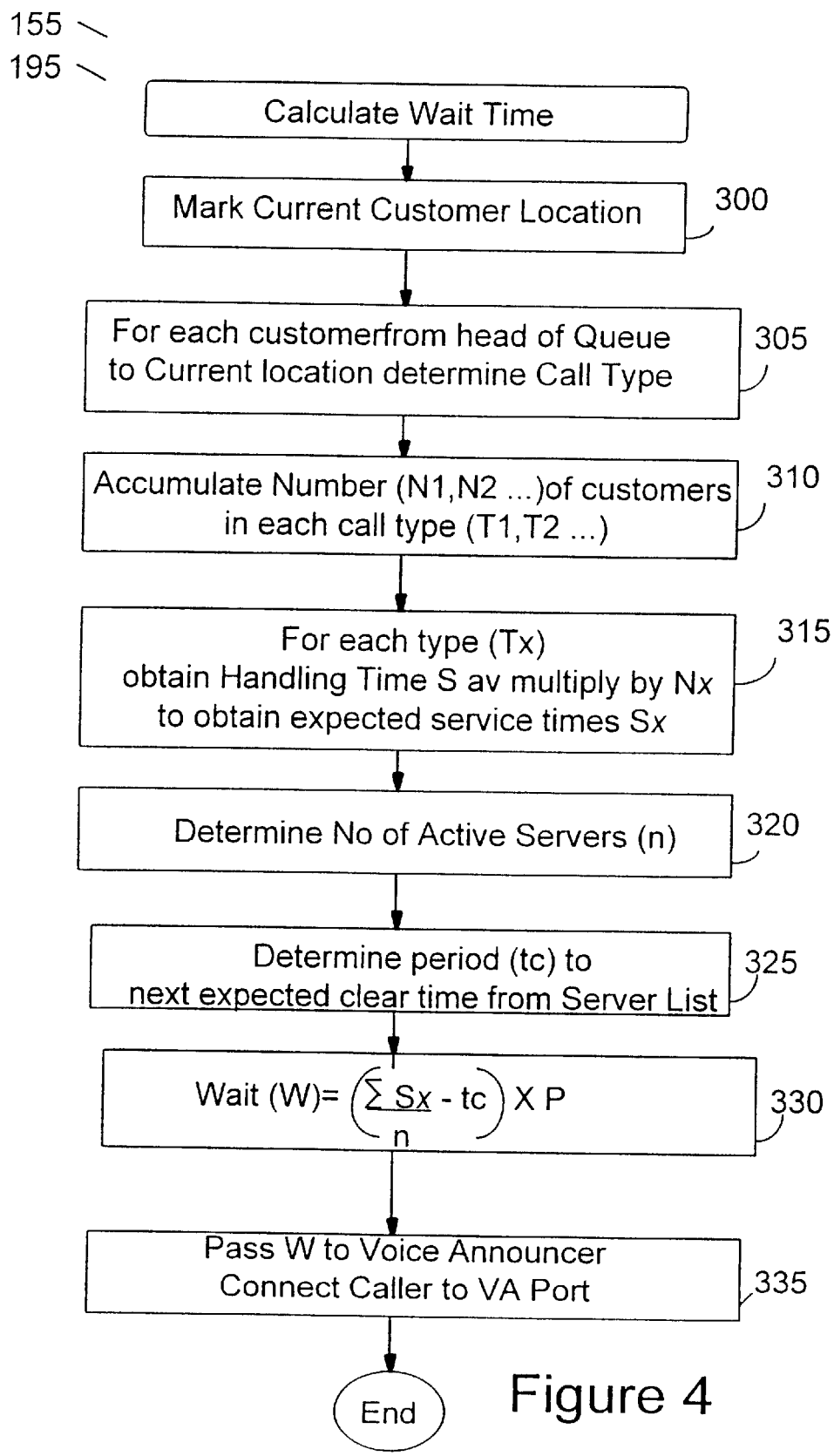
FIG. 4 shows the calculate waiting time macro function of FIG. 3B.

Considering the calculate wait time macro function as used in steps 155 and 195 of FIG. 3, with reference to FIG. 4, the current customer location in table 1 is marked (step 300). Using the head of queue pointer at step 305, the number of customers ahead of the current customer location in queue and their call type is determined from table 1 and accumulated at step 310. For each type of call (referred to as TX) the average serving time (S av) is obtained from data table 4 and multiplied by the respective number of customers ahead in the queue NX, to obtain the expected service time (Sx) for each of the types.

Using table 2, the number of active servers on the ports 3 is determined at step 320 to provide a figure (n). Also from table 2, the expected clear time of the next server anticipated to clear can be obtained, thereby obtaining a clear time (tc) from which, at step 330, an anticipated wait time W can be calculated as the sum of all of the expected service times Sx divided by the number of active servers (n) minus the expected clear time period (tc). In order to make the calculations slightly more accurate, a performance adjustment factor P may also be applied to the calculated wait time W.

Having calculated the wait time W, the processor 8 causes the input port 2 on which the current customer is connected to be connected to the output port 4 to the voice announcement system 5 and at the same time passes the figure derived from W (that is the estimated wait time for the current caller) to be passed to the system 5. Thus, the voice announcement system, when connected to the caller, may carry an announcement such as "you are currently held in a queue and it is expected that an operator will answer your call in "W" minutes/seconds/".

Depending upon the point at which the calculate wait time macro was entered, the processor 8 returns either to await any further event interrupt or to storing the estimated wait time at step 160.

Figure 6:
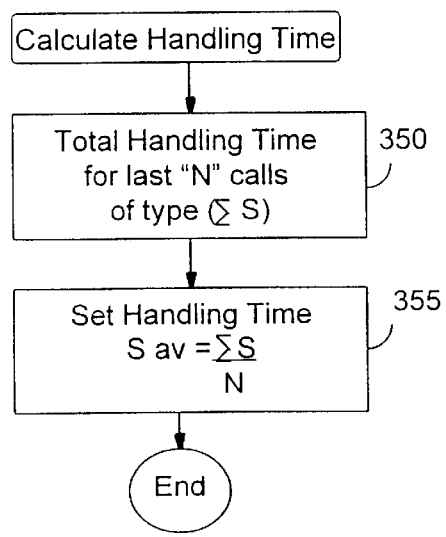
FIG. 6 shows the calculate handling time macro of FIG. 3.

As has been previously noted, as each call is cleared at step 145 the time taken to handle the call is substituted for the oldest time to handle held in table 4 for the respective call type. This enables calculation by the macro 205 of the average handling time for the last "n" calls of specific type. Thus, referring to FIG. 6, the macro totals all the handling times for the last N calls of the particular type (if more than one) at step 350. By dividing this at step 355 by the number of calls involved, the average handling time of S av can be stored in table 4 with respect to the particular call type. As has been previously indicated, this figure is used in the calculation of wait time. Because the handling time is constantly being updated by replacing the oldest piece of data by the latest piece of data, variations of performance over a period of time can be taken into account by the system so that the wait figure received by a caller on the input port 2 fairly accurately reflects current performance of the servers on the output port 3. As previously noted, there may be a number of tables carrying server performance with respect to the call types. In general, an average of each call type across all servers is calculated for use as S av in the calculation of wait times. However, with respect to expected clear time stored in table 2, it may applicable to have an S av calculation in respect of each of the servers.

Figure 5:
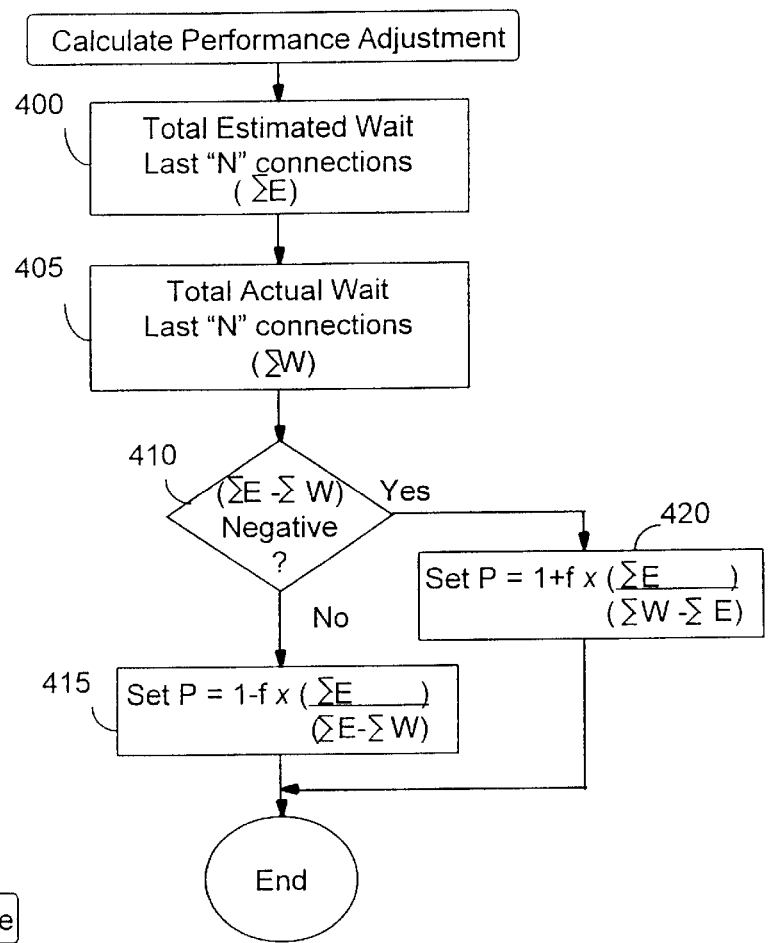
FIG. 5 shows the calculate performance adjustment macro of FIG. 3B.

Turning now to FIG. 5, to seek to make the best possible calculation of the wait time estimate (W), table 3 is used. Each time a caller is connected to a server on the output port 3, at step 190 a performance adjustment (as shown in FIG. 5) is carried out. Thus for each of the last "N" connections the estimated wait period is summed at step 400 and the actual wait period is calculated for the same N connections at step 405. The difference between the two calculations ($\Sigma E - \Sigma W$) is a measure of the actual performance of the estimating system, and at step 410 a determination as to whether the system is over or under estimating the actual wait time is carried out. In dependence upon this, performance factor P as used in the calculate wait time macro can be arrived at. Thus in one case at step 415 P is set at less than 1, that is to say the wait time to be broadcast requires to be shorter where in the other case at step 420 a factor greater than 1 is obtained.

Although a step to limit variations in the value of P has not been shown, it will be appreciated that P may be bounded such that if $\Sigma E - \Sigma W$ at step 410 approaches zero no amendment of the current performance factor P is carried out.

The value of "f" shown in steps 415 and 420 may be system dependent and is determined by the operator on installation or subsequently.

It is noted that once a customer has received a call answer by virtue of connection to the voice announcement system 5 on clearance from the voice announcement, the input port 2 may be connected to an output port 6 which provides some form of entertainment, for example music, on hold.

Figure 7:
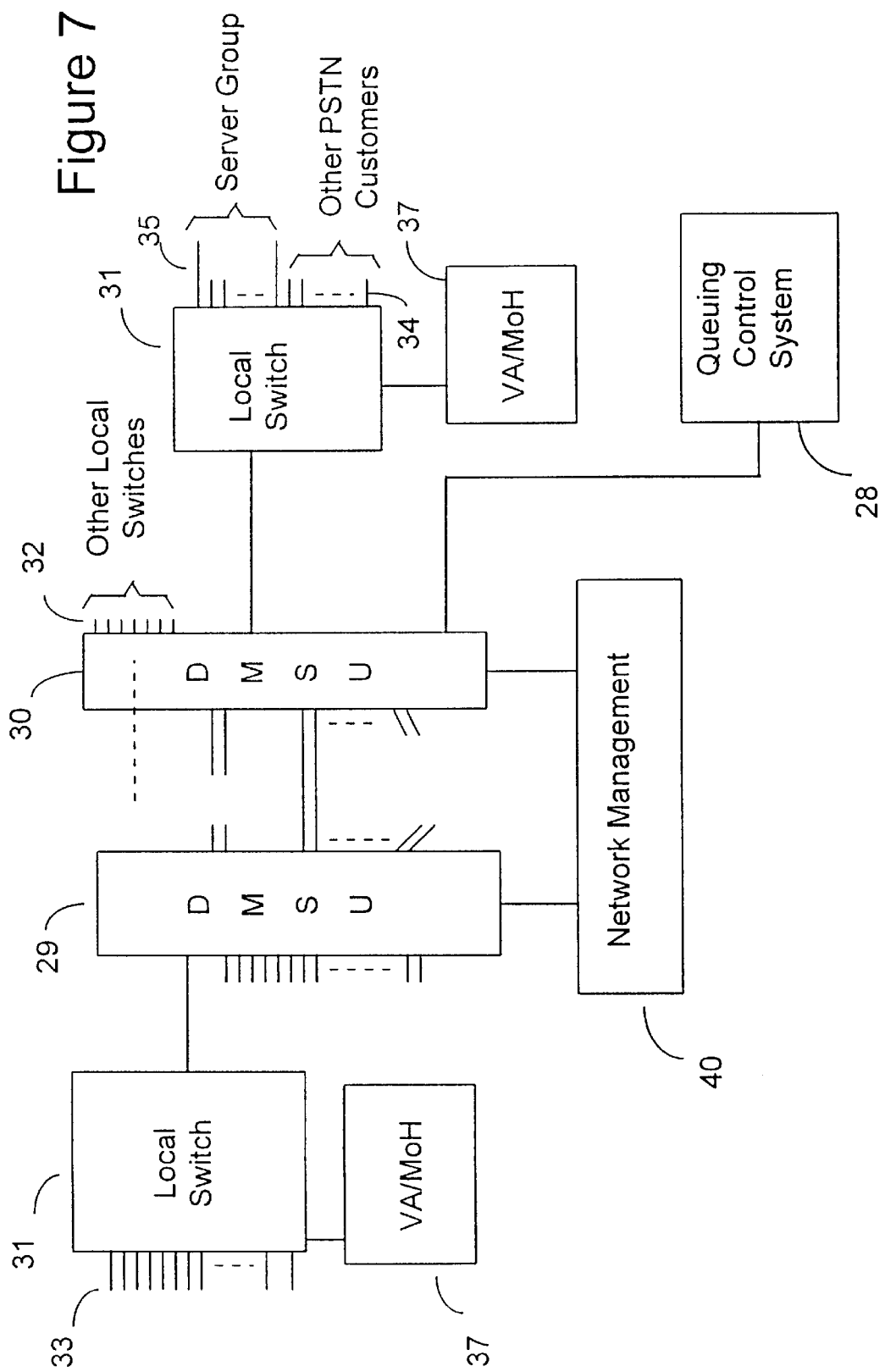
FIG. 7 shows a block schematic diagram of an adaptation of the PSTN incorporating the customer queuing arrangement.

While as hereinbefore described the system is for a stand alone use with a multiplicity of exchange lines incoming to a limited number of operators, it will be appreciated that the system can be applied to a much larger network, for example the public switched network as shown in FIG. 7. Thus referring now to FIG. 7, the control system 28 may be incorporated as a platform on an intelligent network of the kind comprising a multiplicity of fully interconnected digital switching units represented here by digital main switching units 29 and 30. Each of the digital main switching units is connected to a number of local switches 31 by trunks 32 for providing service to lines to customer premises 33, 34, and 35. A network management system 40 controls the connection of the network. Interconnections between the MSUs may be as a result of data signalling using a specific data channel of time division multiplex linking through the digital network. This will usually use protocols such as that described with respect to C 7 signalling.

Now, for example, if an organization has a number of lines 35 to its operators then calls from the PSTN customers, for example those connected to lines 33 and 34, may be connected across the network only when one of the lines 35 becomes free and active. In this case, when a digital unit receives data from the local switch 31 indicating that a customer on one of the lines 33 has dialled a number for one of the lines 35, the queuing control system platform 28 may be notified. If the control system 28 has received an indication by way of the DMSU 32 data channels that a free line in the server group is available, then the network may be notified accordingly and the call switched though from the local switch 31 through the DMSUs to the local switch on which lines 35 exist, and no further action, other than possibly to monitor for clearance as hereinbefore described for the purpose of calculating handling times, will be required by the platform 28. However, if none of the lines 35 is currently free then the caller on line 33 may be locally connected to a voice announcement system 37 with the network control system providing periodic switching, e.g., music on hold and voice announcement, with the expected wait being calculated and forwarded across the data side of the network. In this way, the capacity of the public switched network is not used unless the call can be connected to the server group on one of the lines 35. Once one of the lines 35 becomes free, the call queuing platform 28 may cause the system to set up the connection from the line 33 through the network to line 35 in a known manner.

While a specific method of calculation of the estimated wait time has been described herein, another method of determining an expected wait time is to create a table of expected clear times with respect to each server which may be present (referring again to FIG. 1) on the output ports 3. Thus table 2 carries an expected clear time based on the last start time and the type of call. Thus a table of types can be used to allocate each caller in the queue of table 1 on a nominal basis and, by an iterative process, determine the expected connect time for all subsequent callers in the queue. The expected connect time may then be provided to the voice announcement system in the same manner as for "W".

While not specifically described herein, it will be noted that the system then responds specifically to variations in call dropout rate (that is callers who release from input ports prior to connection to a operator).

Further, the system may be pre-programmed by the operator with timings at which servers may join or leave the network server pool, for example, and other factors such as seasonal variations may be taken into account.

In a further development, the system may be arranged to calculate the expected waiting time W using more than one of the methods described previously so that utilising the performance adjustment P and comparing the estimated waiting time with the latest waiting time for each method of calculation, the most accurate current estimation method may be used.

Further factors which may be taken into account in the calculation of P or in considering the weighting factor may be based upon historic records of calling patterns, weighting factors and performance accuracy for a corresponding period, for example, at the same time of day on the same day of the preceding week or month or year.

The system may also be responsive to operator input of anticipated advertising times, mail shots of press advertisements to determine the expected response and to modify performance adjustment accordingly.

Other factors, including anticipated shift changes, closure of other server centres and the like may also be taken into account.

The system may also be used to predict server requirements by utilising historic records in combination with the waiting calculation methods so that by determining a simulated calling pattern, the number of servers required to bound the estimated wait period may be estimated. Such information may be used by a service provider to vary the operation relationship pattern of the servers in use.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

We claim:

1. A call queuing system comprising:

switch means having a plurality of input ports for connection to incoming telephone lines and a plurality of primary output ports for connection to telephone handling servers, control means responsive to calls on the input ports to selectively effect connections through the switch means to one of the output ports, the control means also being arranged to determine which, if any, of the output ports is not currently connected to an input port and to effect connections sequentially to the output ports, the switch means further having at least one secondary output port to which calls arriving at the input ports are switched if none of the primary output ports are available, said secondary output port(s) being connected to an announcement system arranged to transmit a message to calling but unanswered customers;

the control means allocating each unanswered customer to the next position in a queue, calculating an approximate time for which the customer may be expected to wait prior to connection to a telephone handling server and causing voice announcement means to transmit the calculated time to the customer;

the control means calculating an approximate time from service data defining the average service time for each of a multiplicity of previously connected calls, server data defining the number of servers currently in operation and the number of customers in the queue ahead of the customer currently connected to the voice announcement means;

wherein each time a call is connected to the voice announcement means, the control means causes data defining the calculated waiting time to be stored together with the actual time of connection and upon connection of such call to a telephone handling server determines the difference, between the calculated waiting time and the actual waiting time such that a weighting factor maybe applied in subsequent call waiting time calculations.

2. The call queuing system as claimed in claim 1, wherein said service data defines the average service time for each of a plurality of different servers connected to said secondary output ports and said server data further defining actual servers currently in operation.

3. The call queuing system as claimed in claim 1, wherein each input port is allocated to one of a plurality of telephone numbers, said telephone numbers being indicative of a respective service category selected by calling customers, the service data for each category being stored such that in calculating the waiting time for a designated customer, the control means determines the number of queuing customers ahead of a designated customer in each category together with the service data for the respective category, and the number of active servers, to determine the calculated waiting time.

4. The call queuing system as in claim 1, wherein said control means causes each customer in said queue to be connected in turn to one of said secondary output ports and on each such connection of said customer, said control means recalculates the respective waiting time to be announced, said customers being reconnected to said secondary output port on occurrence of at least one of the following events:

expiry of a predetermined period of time since connection of said calling customer to said secondary output port;
one or more preceding customers in said queue being connected to a primary output port;
one or more primary output ports being activated;
one or more primary ports being deactivated; and
one or more customers leaving said queue by disconnection.

5. A method of estimating waiting time for a caller in a queue of callers waiting for service from a server in a pool of servers, said method comprising the steps of;

determining a position of each caller in a queue of callers;
determining an average time for a server to serve a caller;
determining, for each active server, an anticipated time at which each said active server will become available to serve a caller; and
estimating the waiting time for each caller in the queue based on the position of each caller in the queue, the average time for a server to serve a caller, the number of active servers, and the anticipated time at which each active server will become available.

6. The method of claim 5, wherein the step of determining an anticipated time at which each active server will become available is based on a start time at which each active server was last connected to a caller.

7. The method of claim 5, wherein the anticipated time at which each active server will become available is based on historical data of each active server.

8. The method of claim 5, comprising:

determining a category of service for each caller in the queue of callers; and
determining an average time for a server to serve a caller based on the category of service for said caller.

9. The method of claim 5, further comprising the steps of:

determining a weighting factor based on a difference between the estimated waiting time and an actual waiting time; and
applying said waiting factor to subsequent estimated waiting times.

10. The method of claim 9, wherein the step of determining a weighting factor includes dynamically adjusting the weighting factor based on a difference between a sum of previous estimated waiting times and a sum of previous actual waiting times.

11. The method of claim 5, further comprising the step of:

connecting the callers in the queue for whom waiting times have been estimated to a voice announcement system, said voice announcement system announcing the estimated waiting times to said callers.

12. The method of claim 11, further comprising the step of:

reconnecting callers in the queue to the voice announcement system; and
re-estimating the waiting time for callers in the queue upon the occurrence of a predetermined event, said predetermined event being at least one of the group of events comprising: expiration of a predetermined period of time since connection of a caller to the voice announcement system, connection of one or more preceding callers in the queue to a server, and a change in the number of active servers.

13. A call queuing system, comprising:

a switch, said switch including a plurality of input ports for connection to incoming telephone lines and a plurality of output ports for connection to telephone servers;
a controller responsive to calls on said input ports, said controller selectively effecting connections between said input ports and said output ports through said switch, said controller further being arranged to determine which of said output ports is not connected to an input port and to effect connections sequentially to said output ports;
said switch further comprising at least one secondary output port to which calls arriving as said input ports are switched if no primary output ports are available;
an announcement system connected to said secondary output port, said announcement system being arranged to transmit a message to calls that are switched to said secondary output port;
said controller allocating each call connected to said secondary port to a position in a queue and calculating an estimated waiting time for which each call in said queue may be expected to wait prior to connection to a server, and causing said announcement system to transmit the respective estimated waiting time to each call in the queue;
wherein said estimated waiting times are based on an average service time for each of a plurality of previously connected calls, server data defining the number of servers in operation, the number of calls in the queue ahead of the calls currently connected to the announcement system and an anticipated time at which an active server will become available to service a call.

14. The call queuing system of claim 13, wherein said server data further comprises:

an average service time for each of a plurality of servers currently in operation.

15. The call queuing system of claim 14, wherein said controller compares an actual waiting time for a given call to the estimated waiting time for said given call to determine a weighting factor that may be applied to subsequent estimated waiting times.

16. The call queuing system of claim 15, wherein said weighting factor is a difference between a sum of all previous actual waiting times and a sum of all previous estimated waiting times.

17. The call queuing system of claim 13, wherein each input port is allocated to one of a plurality of telephone numbers, said telephone numbers being indicative of a category of service selected by a caller, service data for each category being stored, said service data including an average service time for each of a plurality of previously connected calls in each category, and the controller calculating estimated waiting time for each caller in each category based on the service data for each respective category, the number of active servers, the number of callers ahead of the call currently connected to the announcement system in a given category and an anticipated time at which an active server in the given category will become available to service a call.

18. The call queuing system of claim 13, wherein said controller determines a list of anticipated times at which each server will become free based on stored data defining a time at which each server was last connected to a call and service data defining an average length of time taken by each server to handle a connected call, the controller further correlating the position of each call in the queue with the list of anticipated times to determine the estimated waiting time.

19. The call queuing system of claim 13, wherein said controller causes each caller to whom a previous announcement has been made to be reconnected with said announcement system and re-estimates the waiting time for callers in the queue upon the occurrence of a predetermined event, said predetermined event being at least one of the group comprising: expiration of a predetermined time period since connection of a call to the announcement system, connection of one or more preceding callers in the queue to a server, and a change in the number of active servers.

20. A method of estimating an approximate time for which a designated customer in a queue of customers connected through a telephone system may be required to wait for connection to a server comprising the steps of:

determining the number of customers in the queue ahead of the designated customer;

calculating an average handling time for each of a plurality of servers to handle a customer connection to provide a mean service time;

multiplying the number of customers by the mean service time and dividing by the number of active servers; and determining a weighting factor from an originally estimated waiting time and an actual waiting time of at least one previously handled customer call; and applying said weighting factor to each estimate of approximate waiting time.

21. The method as claimed in claim 20, wherein an approximate time period until one of said servers is expected to clear a preceding call is added to the waiting time prior to announcement of said waiting time to a customer.

* * * * *